United States Patent [19]

Schack et al.

[11] Patent Number: 4,594,232

[45] Date of Patent: Jun. 10, 1986

[54] PROCESS FOR PREPARING PENTAFLUOROTELLURIUM HYPOFLUORITE

[75] Inventors: Carl J. Schack, Chatsworth; Karl O. Christe, Calabasas, both of Calif.

[73] Assignee: The United States of America as represented by the Secretary of the Air Force, Washington, D.C.

[21] Appl. No.: 767,923

[22] Filed: Aug. 21, 1985

[51] Int. Cl.$^4$ .................... C01B 11/24; C01B 19/00; C01B 35/06
[52] U.S. Cl. .................................. 423/293; 423/276; 423/277; 423/473; 423/489; 423/508
[58] Field of Search .............. 423/473, 508, 579, 467, 423/472, 512, 277, 278, 489, 293

[56] References Cited

U.S. PATENT DOCUMENTS

| | | | |
|---|---|---|---|
| 4,216,338 | 8/1980 | Schack et al. | 560/227 |
| 4,222,968 | 9/1980 | Schack et al. | 260/657 |
| 4,462,975 | 7/1984 | Schack et al. | 423/473 |

OTHER PUBLICATIONS

Seppelt et al., "Stability of Xenon (II) Compounds", Inorganic Chem., vol. 12, No. 11, 1973, pp. 2727-2730.
Schack et al, "Synthesis and Characterization of TeF$_5$OF", Inorg. Chem., vol. 22, pp. 18-21, 1983.

Primary Examiner—John Doll
Assistant Examiner—Jeffrey E. Russel
Attorney, Agent, or Firm—Donald J. Singer; Stanton E. Collier

[57] ABSTRACT

A novel method for synthesizing pentafluorotellurium hypofluorite by effecting a reaction between B(OTeF$_5$)$_3$ and elemental fluorine.

2 Claims, No Drawings

PROCESS FOR PREPARING PENTAFLUOROTELLURIUM HYPOFLUORITE

STATEMENT OF GOVERNMENT INTEREST

The invention described herein may be manufactured and used by or for the Government for governmental purposes without the payment of any royalty thereon.

BACKGROUND OF THE INVENTION

This invention relates to hypofluorite compounds and to a novel method for their preparation. In a more particular manner, this invention concerns itself with an improved method for synthesizing pentafluorotellurium hypofluorite ($TeF_5OF$) which utilizes the direct fluorination of $B(OTeF_5)_3$ with elemental fluorine.

Hypofluorite compounds are well known and find utility in a wide variety of industrial applications. They are especially useful as fluorinating agents for introducing fluorine atoms into another compound, and as intermediates in various synthetic reactions. Until recently no successful method was available for the synthesis of the unknown $TeF_5OF$ although at least one unsuccessful attempt was made by Seppelt et al, Inorg. Chem., 1973, 12, 2727.

However, experimental efforts proved successful and a novel method for synthesizing $TeF_5OF$ was discovered such as U.S. Pat. No. 4,462,975. It was found that it could be produced in stable form and in relatively high yield. The synthesis of this compound was achieved by a method which used fluorine fluorosulfate as a fluorinating agent. The method was carried out by effecting a reaction between $CsTeF_5O$ and $FOSO_2F$ at relatively low temperatures. This reaction represented a new route to the synthesis of hypofluorites but, unfortunately, it entailed certain drawbacks. Among these drawbacks was the need for careful low temperature control, long reaction times up to nine days and the requirement for excess $CsTeF_5O$ together with less than optimum yields approximating 70%. Furthermore, the necessity to prepare and handle the treacherously explosive $FOSO_2F$ was a decided disadvantage.

However, as the result of a continuing research effort it was found that a new and improved process for the synthesis of $TeF_5OF$ could be accomplished by utilizing elemental fluorine and $B(OTeF_5)_3$ as reactants at elevated temperatures. This new procedure provided $TeF_5OF$ at a higher yield and with shorter reaction times than were achieved heretofore.

SUMMARY OF THE INVENTION

The present invention concerns itself with a novel method for synthesizing pentafluorotellurium hypofluorite which utilizes the direct fluorination of $B(OTeF_5)_3$ with elemental fluorine. This new procedure provides $TeF_5OF$ in higher yields with shorter reaction times and avoids the use of the unpredictably explosive fluorine fluorosulfate as a reaction component.

Accordingly, the primary object of this invention is to provide a novel method for synthesizing hypofluorite compounds.

Another object of this invention is to provide a method for synthesizing hypofluorite compounds that uses elemental fluorine as a reaction component.

Still another object of this invention is to provide a method for synthesizing the compound, pentafluorotellurium hypofluorite.

The above and still other objects and advantages of the present invention will become more readily apparent upon consideration of the following detailed description thereof.

DESCRIPTION OF THE PREFERRED EMBODIMENTS

Pursuant to the above defined objects, the present invention provides a novel process for the synthesis of pentafluorotellurium hypofluorite. Although pentafluorotellurim hypofluorite has been synthesized and characterized, its previous synthesis was achieved in accordance with the reaction scheme outlined below:

(1)

This reaction represented a new and successful route to the synthesis of hypofluorites but, unfortunately, it involved a number of disadvantages. Among these disadvantages, was the need for careful low temperature control, the need for long reaction times of approximately nine days and a requirement for excess $CsTeF_5O$. Less than optimal yields which amounted to only about 70% also constituted a problem. Furthermore, the necessity to prepare and handle the treacherously explosive $FOSO_2F$ was a decided disadvantage.

In an attempt to overcome these problems a research effort was undertaken that resulted in the discovery of the novel method of this invention. This new method was accomplished in accordance with the following reaction.

(2)

This reaction provides $TeF_5OF$ in 95% yield at a temperature of 115° C. after one day reaction time using a conventional Monel reactor. The ultimate separation of byproducts is easy and since commercial $F_2$ is the fluorinating agent, the hazardous $FOSO_2F$ is avoided.

This new and excellent route to the synthesis of $TeF_5OF$ renders the utilization of this material as a precursor for the synthesis of gyrofluids much more acceptable. Overall, the reaction referred to above provides $TeF_5OF$ in 80 to 95% yield at temperatures of from 100° to 115° C. after only one to three days of reaction time. Either stainless steel or Monel reactors may be utilized with the latter giving consistently higher yields in shorter reaction times. Separation of the resultant byproducts, mainly $BF_2$ and $TeF_5OH$, is easily accomplished. The need for synthesizing the hazardous $FOSO_2F$ is eliminated since commercial $F_2$ is utilized as the reaction component. Additionally, this synthesis represents the first example of the formation of a hypofluorite involving the fluorinative scission of a boron-oxygen bond.

The volatile materials used in the reaction were manipulated in a stainless steel vacuum line equipped with Teflon FEP U-traps, 316 stainless steel bellows-seal valves and a Heise Bourdon tube-type pressure gauge. Pentafluorotelluric acid was prepared from telluric acid, $Te(OH)_6$, and fluorosulfuric acid, $HSO_3F$, in accordance with the reaction as shown in Schack C. J.; Wilson, W. W.; and Christe K. O.; Inorg. Chem. 1983, 22, 18. The reaction of $BCl_3$ with excess $TeF_5OH$ at room temperature provided $B(OTeF_5)_3$ in accordance with the reaction of Sladky, F.; Kropshofer, H.; and Leitzke, O., J.C.S. Chem. Comm. 1973, 134. It should be noted that although difficulties or incidents in the preparation and handling of $TeF_5OF$ were not encountered, its hypofluorite nature demands treatment as a potentially violent oxidizer. Therefore, suitable safety precautions should be followed when dealing with this product.

The following example illustrates a specific embodiment of this invention.

In the dry nitrogen atmosphere of a conventional glove box, a sample of $B(OTef_5)_3$ (0.95 mmol) was weighed and transferred to a prepassivated 16 ml Monel cylinder equipped with a Monel Hoke valve. The cylinder was transferred to the vacuum line, evacuated, cooled to $-196°$ C. and $F_2$ (about 7 mmol) was added. The closed cylinder was warmed to ambient temperature before placing it in an oven at 115° C. Afer 24 hours the cylinder was cooled to ambient temperature before cooling further to $-196°$ C. (hot Monel should not be cooled directly $-196°$ C. since it may rupture catastrophically). The excess $F_2$ was pumped away through a scrubber and then while allowing the reactor to warm from $-196°$ C. to room temperature, the volatile products were separated by fractional condensation through a series of U-traps cooled at $-78°$, $-126°$, and $-196°$ C. In the lowest temperature trap were $BF_3$ and a little $TeF_6$ (1.05 mmol total), while the trap at $-78°$ C. contained $TeF_5OH$ (0.05 mmol). Retained in the trap cooled at $-126°$ C. was pure $TeF_5OF$ (2.68 mmol, 94% yield based on $B(OTeF_5)_3$.

Using a Monel reaction vessel and a 100° C. reaction temperature for 22 hours provided a yield of $TeF_5OF$ of about 55%. This yield was increased to 95% when the reaction was examined after a total of 67 hours at 100° C. When a 30 ml stainless steel cylinder was employed as a reactor at 100° C., the yield of $TeF_5OF$ was 74% after 64 hours and 80% after 83 hours. At 115° C. in the stainless steel reactor, the hypofluorite was formed in 43% yield after 24 hours and 81% after 51 hours total. No unreacted $B(OTeF_5)_3$ remained at the conclusion of these reactions.

From an examination of the above, it can be seen that the present invention provides an improved method for the synthesis of $TeF_5OF$. It also provides a simple and efficient route for synthesizing a particular hypofluorite material and is the first time that the formation of a hypofluorite was accomplished through the fluorinative scission of the boron-oxygen bond.

While this invention has been described with reference to a preferred embodiment, it should be understood that various alterations and modifications as come within the purview of the appended claims are intended to be included herein.

What is claimed is:

1. A method for synthesizing pentafluorotellurium hypofluorite which comprises the steps of:
    A. effecting a reaction between (a) $B(OTeF_5)_3$ and (b) elemental fluorine at a temperature ranging from about 100° to 115° C.;
    B. continuing said reaction for a period of time of about one to three days;
    C. cooling said reaction to about $-196°$ C.; and
    D. raising the temperature of said reaction to room temperature while simultaneously separating the resultant reaction products.

2. A method in accordance with claim 1 wherein said reaction temperature is about 115° C. and said reaction period is about 24 hours.

* * * * *